Aug. 25, 1964          J. G. JOLLY          3,145,910
SPRING MOUNT FOR FAN MOTOR OF VENTILATING EQUIPMENT
Filed June 5, 1961          3 Sheets-Sheet 1

INVENTOR
John G. Jolly
BY Wood, Herron & Evans
ATTORNEYS.

Aug. 25, 1964    J. G. JOLLY    3,145,910
SPRING MOUNT FOR FAN MOTOR OF VENTILATING EQUIPMENT
Filed June 5, 1961    3 Sheets-Sheet 3

INVENTOR
John G. Jolly
BY Wood, Herron & Evans,
ATTORNEYS.

United States Patent Office 3,145,910
Patented Aug. 25, 1964

3,145,910
SPRING MOUNT FOR FAN MOTOR OF VENTILATING EQUIPMENT
John G. Jolly, Cincinnati, Ohio, assignor to Nutone, Inc., Cincinnati, Ohio, a corporation of New York
Filed June 5, 1961, Ser. No. 114,789
6 Claims. (Cl. 230—117)

This invention relates to ventilating equipment, and it is directed particularly to a vibration absorbing, spring mount for the fractional-horsepower electric motors which are used to drive the fans of such equipment.

For the purposes of this disclosure, the spring mount of this invention is illustrated and explained in relation to the motor of an exhaust fan which is enclosed within a housing adapted to be built into the ceiling of a room such as a bathroom. It will be appreciated, however, that the spring mount is not limited to this particular use, but that it may be used in any fan or blower installation wherein vibration is a problem.

The vibrations which occur in a running fan motor usually are the result of an imbalance in the fan due to a bent blade. Imperfections in blades occurring as a result of carelessness in manufacture seldom are contributing factors. In almost all instances, careless handling of the motor and fan in the field causes the imbalance which gives rise to noisy vibrations. Serious injury to a blade is immediately apparent and may be corrected by the installer. But less serious injuries, which may have little effect upon the operating efficiency of the fan, a bent blade for example, are easily overlooked by the installer, but they can, and often do, give rise to objectionable vibrations and noisy operation.

Spring mounts have been provided in the past to absorb minor fan vibrations, the objective being to prevent these vibrations from reaching the housing in which the fan is mounted, since the housing acts as a sounding board. However, the spring mounts of the past have permitted a slightly imperfectly balanced fan to wobble or oscillate to an extent that such a fan,, otherwise capable of near perfect operating efficiency, has had to be replaced because of its striking the housing in which it is enclosed. Otherwise expressed, the spring mounts provided in the past have been capable of preventing minor vibrations from reaching the housing, but not capable of dampening bodily movement of a rotating, out-of-balance fan. One is a matter of merely isolating the vibrations. The other is a matter of isolating the vibrations and dampening movement arising as a result of such vibrations.

In view of this, it has been an objective of the invention to provide an inexpensive, spring mount for a fan motor capable of effectively absorbing vibrations occurring as a result of all except major fan blade imperfections, but which does not permit bodily movement of the fan within the mount to the extent that the blades thereof strike the housing in which the fan is mounted.

Another objective has been to provide a spring mount of the type set forth in which that type flexing effective to absorb vibration is permitted, but that type flexing, would occur as a result of motor torque is resisted. That is, the spring mount of this invention is rigid to forces applied tangentially of the motor, but flexible to forces applied in other directions, for example, radially of the motor.

A further objective has been to provide a spring motor mount for a fan in which two mount rings are employed, which rings are configurated to channel the flow of air upstream of the fan blade for most efficiently cooling the motor during its operation.

Other objectives and features of the invention will be readily apparent to those skilled in the art from the following detailed description of the drawings, in which.

Figure 1:
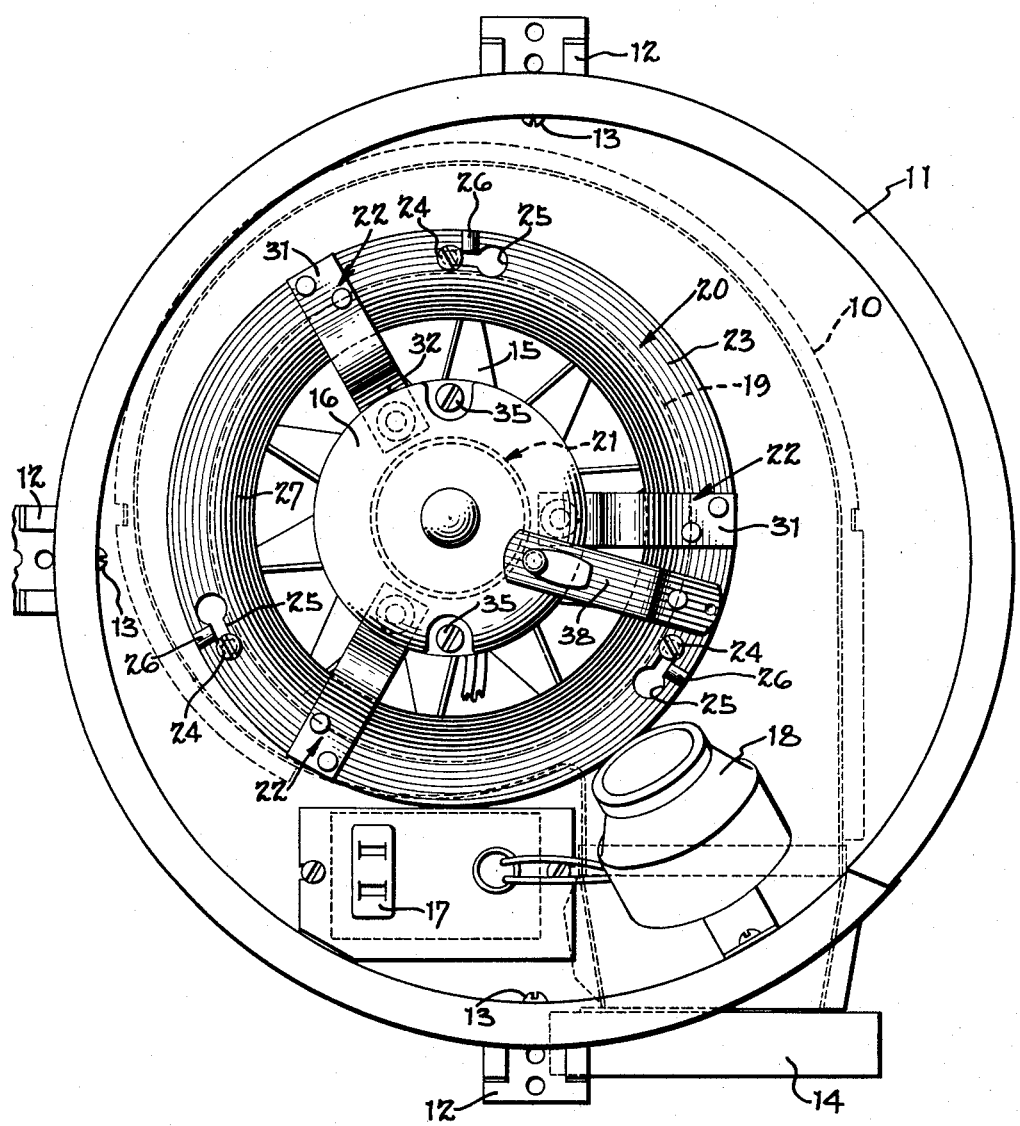
FIGURE 1 is a plan view looking into the housing of a ventilator of a type adapted to be installed in a ceiling and showing a motor mount incorporating the principles of this invention installed therein.

The ventilator shown in the drawings is not complete. It is of a type adapted to be mounted in the ceiling of a bathroom and, in this instance, a light is incorporated in the lower part of the housing.

Additionally, following conventional practices, the ventilator comprises two basic units. One of these units includes the combination of a convolute blower housing 10 and a cylindrical sleeve 11. These two parts, as a unit, are adapted to be installed in a building under construction after "rough-in" when the studs and ceiling rafters are exposed. The housing is of such a size that it fits between rafters which are spaced on standard 16 inch centers. Mount brackets 12, fastened to the cylindrical sleeve by means such as metal screws 13, are employed to secure the blower unit to the rafters. The blower shown in the drawings delivers air through a duct coupler 14 which is at the side of the unit. Thus, a radial delivery fan 15 is employed. However, it will be apparent to those skilled in the art that the principles of the present invention are equally adaptable to fan installations in which the blades are arranged for in-line or axial delivery.

Figure 2:
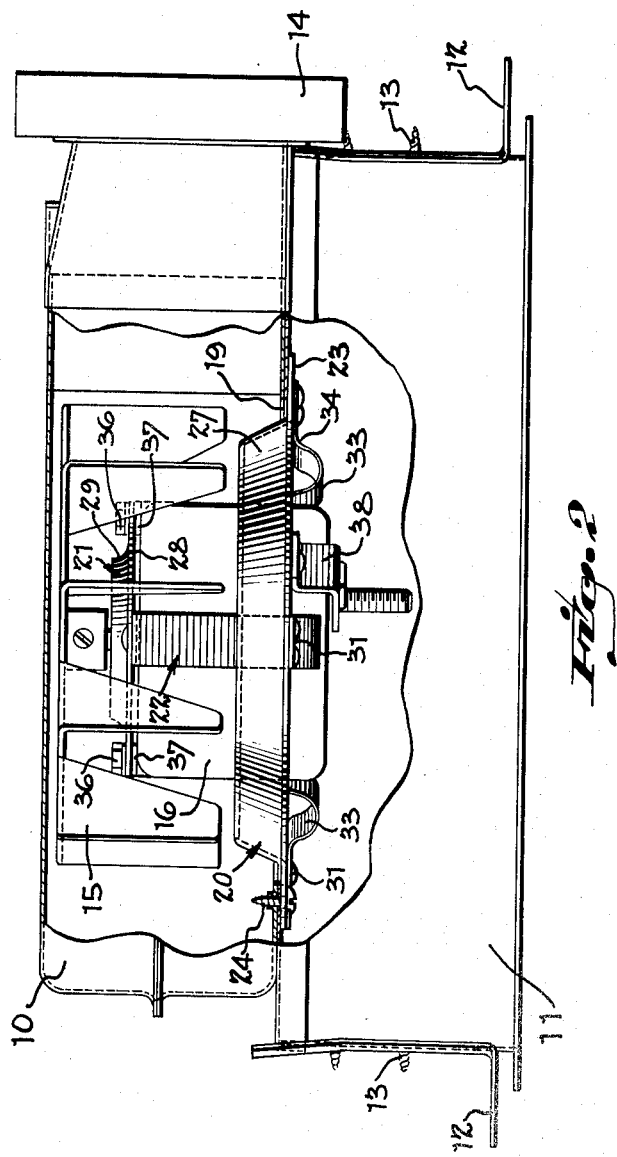
FIGURE 2 is a side view of the housing of FIGURE 1 with parts broken away in order to illustrate the spring mount of this invention.
Figure 3:
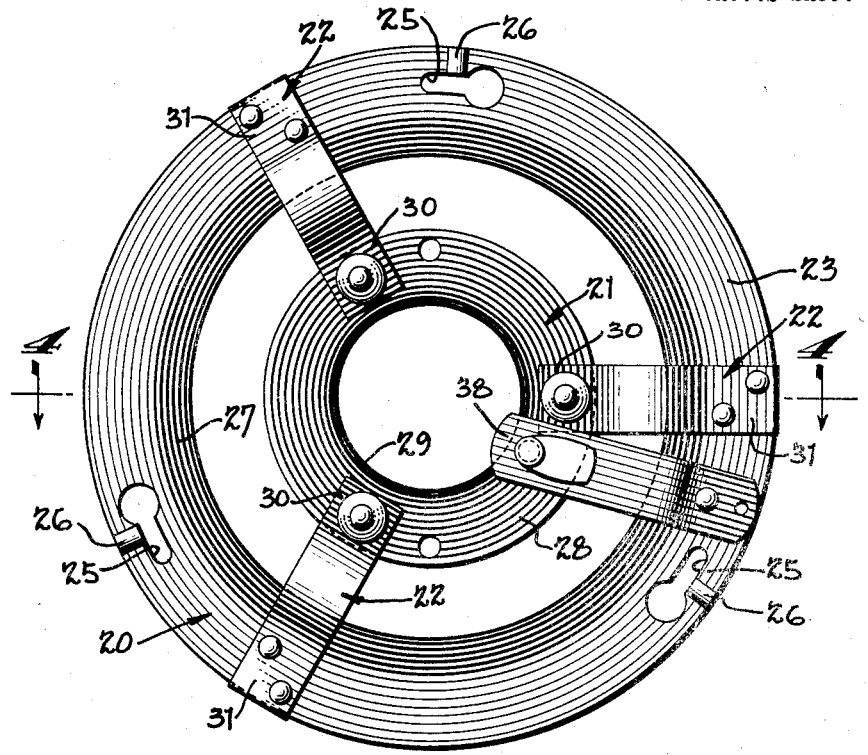
FIGURE 3 is a plan view of the spring mount of this invention.

The second unit is adapted to be installed after plastering and it comprises those parts of the assembly most likely to be injured through rough handling. Those parts include the motor 16 and its mount, to be described in detail at a later point, a light reflector (not shown) and a lens for the light (not shown). A plug-in outlet 17 is provided for electrically connecting the motor to the circuitry of the house, and this plug-in outlet also has an attachment for a light socket 18 as shown in FIGURES 1 and 2.

There is a circular opening 19 from the sleeve through the bottom wall of the convolute blower housing to the inside of the housing. The annular area immediately surrounding circular opening 19 provides a base for securing the spring mount of this invention in place.

The spring mount comprises essentially a venturi ring 20, a motor ring 21, and three spring arms designated 22. Venturi ring 20 includes an annular flange 23 which, as shown in FIGURE 2, rests against the underside of the blower housing surrounding opening 19. This flange is removably locked into place by three metal screws 24, these screws being threadedly engaged in the blower housing and extending through keyhole slots 25 in annular flange 23. The screws 24 and the slots 25 are spaced circumferentially of opening 19, 120 degrees apart. In making the installation, the screws 24 are loosened to the extent to permit a projection 26 associated with each of the keyhole slots 25 to pass during a turning movement in which the venturi ring is rotated to bring the heads of metal screws 24 from the large to the small ends of keyhole slots 25. Once so positioned, in the small ends of the slots, the metal screws 24 can be tightened and thereafter the projections prevent movement of the venturi ring.

The venturi ring also includes a rounded frusto-conical section 27, this section extending through opening 19 in the blower housing and serving to direct and smooth out the flow of air through this opening. The motor ring 21, although considerably smaller than the venturi ring, is substantially the same shape including a flat annular flange portion 28 and a rounded frusto-conical section 29, which section projects in the same direction that the frusto-conical section 27 of venturi ring 20 projects.

Figure 4:
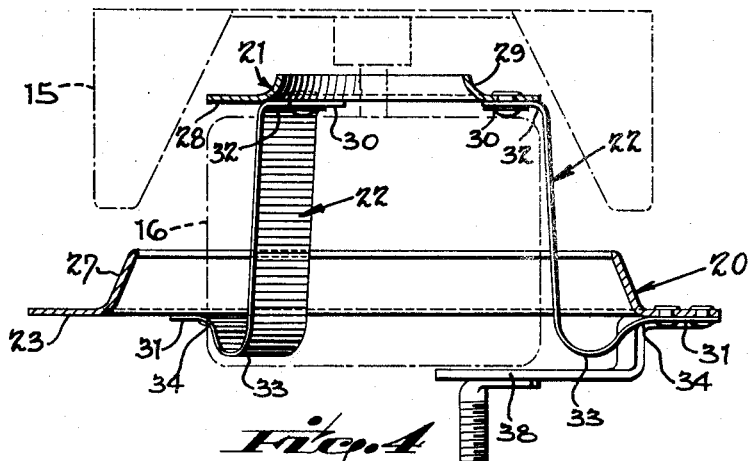
FIGURE 4 is a cross sectional view taken on the line 4—4 of FIGURE 3 with a motor and fan shown within the unit in phantom lines.

The relative sizes of the two rings with respect to the motor is important. It will be noted, referring to FIGURE 4, that the motor 16, which is shown in dot-dash lines, is substantially smaller than the opening through the venturi ring and that the motor ring is approximately the same size as the motor. This provides adequate area surrounding the motor for the flow of air along the sides of the motor and it insures that the motor ring does not interfere with this flow. It also insures that an adequate supply of air flows past the motor in intimate contact with its housing. The opening within the center of the motor ring also establishes a smooth flow of air from the end of the motor so that air may be drawn through this opening from the motor itself, the usual slots (not shown) in the housing of the motor, permitting air to pass through the motor housing.

It is also to be noted that the two rings 20 and 21 are spaced parallel planes, that they are arranged concentrically with respect to the axis of the motor, that the venturi ring surrounds the motor adjacent to one end thereof, and that the motor ring is attached to that end of the motor from which the drive shaft projects. This places the motor ring close to the plane of rotation of the center of gravity of the fan, and this is true whether a radial delivery fan of the type shown in the drawings is employed or whether an in-line delivery fan is employed.

The arms 22 are made of flat spring steel. Each arm has a flat flange 30 at one end thereof which is securely riveted to the motor ring, and a flat flange 31 at the opposite end thereof which is securely riveted to the venturi ring. In between these flanged ends each arm extends along the side of the motor, meeting flange 30 at a small radius 32, and joining the other flange 31 through an arcuate bow 33, which bow projects outwardly beyond the plane of the flange 31. As shown, the bow joins the flange 31 at a larger radius 34 than the radius 32. The three arms are spaced 120 degrees apart. In each instance, the face thereof toward the motor axis is tangent to the motor housing. Arranged in this way, the three flat springs are rigid with respect to those forces tending to rotate the motor within its mount.

Various expediencies may be employed to secure the motor to the motor ring. In the instance shown, two holes are provided at diametrically opposed places on the mount ring and tie bolts 35—35, which extend through the motor from one end to the other, pass through these holes and are secured by means of lock nuts 36—36. It is preferred that washers such as those shown at 37 be interposed between the motor and the mount ring. These washers serve to space the motor from the mount ring so that some air can be drawn through this space over the end of the motor. It is to be noted that these washers are equal in depth to the depth of the rivets employed to secure the flange 30 of the spring arms to the motor ring so that the rivets also make contact with the end of the motor, giving it a solid three-point seat on the motor to prevent any rocking movement of the motor with respect to the motor ring.

The venturi ring also carries a mount bracket 38 which is used to fasten the light reflector in place within sleeve 11 in the blower shown. This bracket is not necessary in other types of installations.

Tests have shown that the spring motor mount of this invention is surprisingly resistant to off-center, rotating loads and that one of the blades of the fan may be seriously damaged and still the motor does not wobble to the extent that the blades strike the blower housing. It is believed that this is a result of mounting the motor at the end thereof adjacent to the drive shaft so that the mount ring is close to the plane of the center of gravity of the spinning fan. Motor wobble which would otherwise occur as a result of severe off-center loads nulls at the center of the motor mount ring. Thus, even though the outer end of the motor, within the venturi ring, may take on a perceptible wobbling movement, this wobbling movement is at a minimum at the opposite end of the motor, and therefore the fan blades, which are at this end of the motor, hold very closely to a true circular path. The result is quieter, vibration-free operation in which motor movement, or wobble, is dampened to an absolute minimum.

As used herein, and in the claims which follow, the word "fan" refers to any rotatable air moving device such as a blower wheel, a propeller type fan, a tangential flow fan and others.

Having described my invention, I claim:

1. A mount for an electric motor having a drive shaft projecting from one end thereof and a fan on said shaft, said mount comprising at least three springs of flat spring steel, means at one end of each spring to secure said end to the motor at the end thereof from which said drive shaft projects, each spring having a straight portion extending along a side of said motor for susbstantially the full length of said motor, means at the opposite end of each spring to secure said opposite end to fixed means positioned radially outwardly of the side of said motor adjacent the end thereof opposit the end from which said drive shaft projects, a bow in each spring extending through an arc of more than 90 degrees between said straight portion and one of the ends thereof, and said springs disposed symmetrically around said motor and presenting flat faces toward said motor in the portions thereof extending along the sides of said motor.

2. A mount for an electric motor having a drive shaft projecting from one end thereof and a fan on said shaft, said mount comprising a plurality of springs of flat spring material, means at one end of each spring to secure said one end to the motor at the end thereof from which said drive shaft projects, means at the opposite end of each spring to secure said opposite end to fixed means disposed radially outwardly of said motor adjacent the end thereof opposite the end from which said drive shaft projects, a bow in each spring extending through an arc of more than 90 degrees beyond at least one of the ends thereof, and said springs disposed symmetrically around said motor and presenting flat faces toward said motor throughout substantially the full length of said motor.

3. A mount for an electrical motor having a drive shaft projecting from one end thereof and a fan on said shaft, said mount means comprising a venturi ring surrounding the end of the motor opposite the end from which said drive shaft projects, said venturi ring being concentric to the axis of the motor being of the size to provide an annular space between the motor and the ring, means to mount said venturi ring in an opening through which air is to be moved by said fan, a mount ring disposed in spaced parallel relation to the venturi ring and affixed to the end of the motor from which said drive shaft projects, at least three flat leaf springs having first ends affixed to the mount ring and second ends affixed to the venturi ring, said leaf springs arranged symmetrically around said motor and presenting flat faces toward said motor over substantially the full length of said motor, and each of said springs having a bow portion projecting beyond the plane of at least one of said rings in the direction away from the other ring.

4. A mount for an electrical motor having a drive shaft projecting from one end thereof and a fan on said shaft, said mount means comprising a first ring surrounding the end of the motor opposite the end from which drive shaft projects, said first ring being concentric to the axis of the motor and being of a size to provide an annular space between the motor and the ring, means to mount said first ring in an opening through which air is to be moved by said fan, a second ring disposed in spaced parallel relation to said first ring and affixed to the end of the motor from which said drive shaft projects, at least three flat leaf springs having first ends affixed to said first ring and second ends affixed to said second ring, said leaf springs arranged symmetrically around said motor and presenting flat faces toward said motor over substantially the full length of said motor, and each of said springs having a bow portion projecting beyond the plane of said first ring in the direction away from said ring.

5. A spring mount for a fan motor comprising a pair of rings disposed in spaced parallel relation on a common axis, one of said rings having an opening therein which is substantially larger than the outer diameter of the other ring, at least three flat leaf springs spaced symmetrically around said common axis and having first ends affixed to one of said rings and second ends affixed to the other of said rings, said leaf springs disposed to present flat sides thereof toward said common axis, and each of said springs having a bow portion therein projecting outwardly beyond at least one of said rings in the direction away from said ring.

6. A spring mount for a fan motor comprising a pair of rings disposed in spaced parallel relation on a common axis, one of said rings having an opening therein which is substantially larger than the outer diameter of the other ring, at least three flat leaf springs spaced symmetrically around said common axis and having first flanged ends affixed to one of said rings and second flanged ends affixed to the other of said rings, said leaf springs disposed to present flat sides thereof toward said common axis, and each of said springs having a bow therein adjacent to the flanged end thereof affixed to the larger one of said rings which projects outwardly beyond the plane of said larger ring in the direction away from said smaller ring.

References Cited in the file of this patent
UNITED STATES PATENTS

| | | |
|---|---|---|
| 2,010,809 | Braine | Aug. 13, 1935 |
| 2,043,934 | Spear | June 9, 1936 |
| 2,096,621 | Skolfield | Oct. 19, 1937 |
| 2,097,071 | Lichten | Oct. 26, 1937 |
| 2,310,772 | Fukal | Feb. 9, 1943 |
| 2,331,056 | Spear | Oct. 5, 1943 |
| 2,488,306 | Marsalis | Nov. 15, 1949 |
| 2,594,688 | Shipiro | Apr. 29, 1952 |
| 2,641,425 | Ostberg | June 9, 1953 |
| 3,019,965 | Lyman | Feb. 6, 1962 |